Patented Feb. 20, 1934

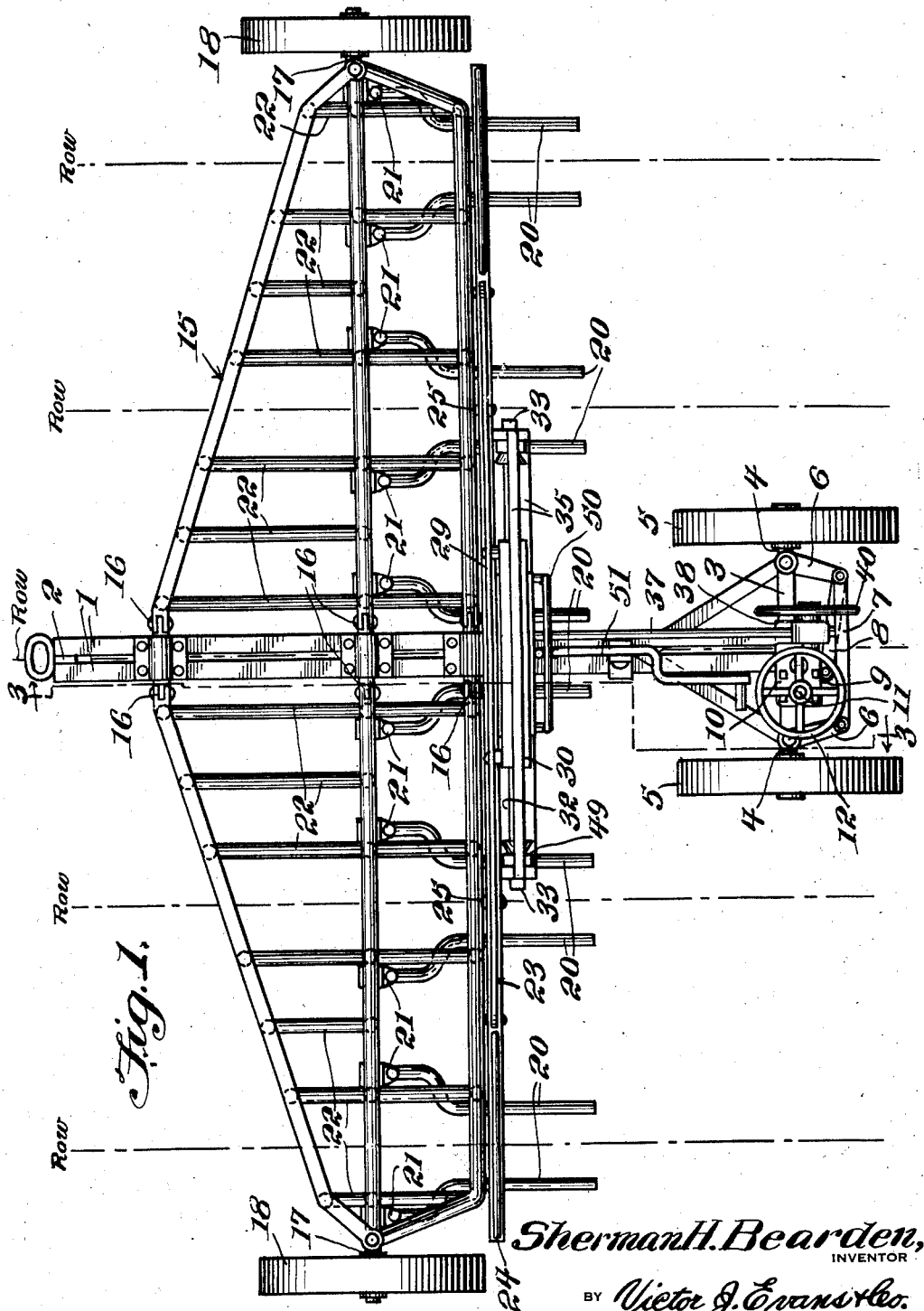

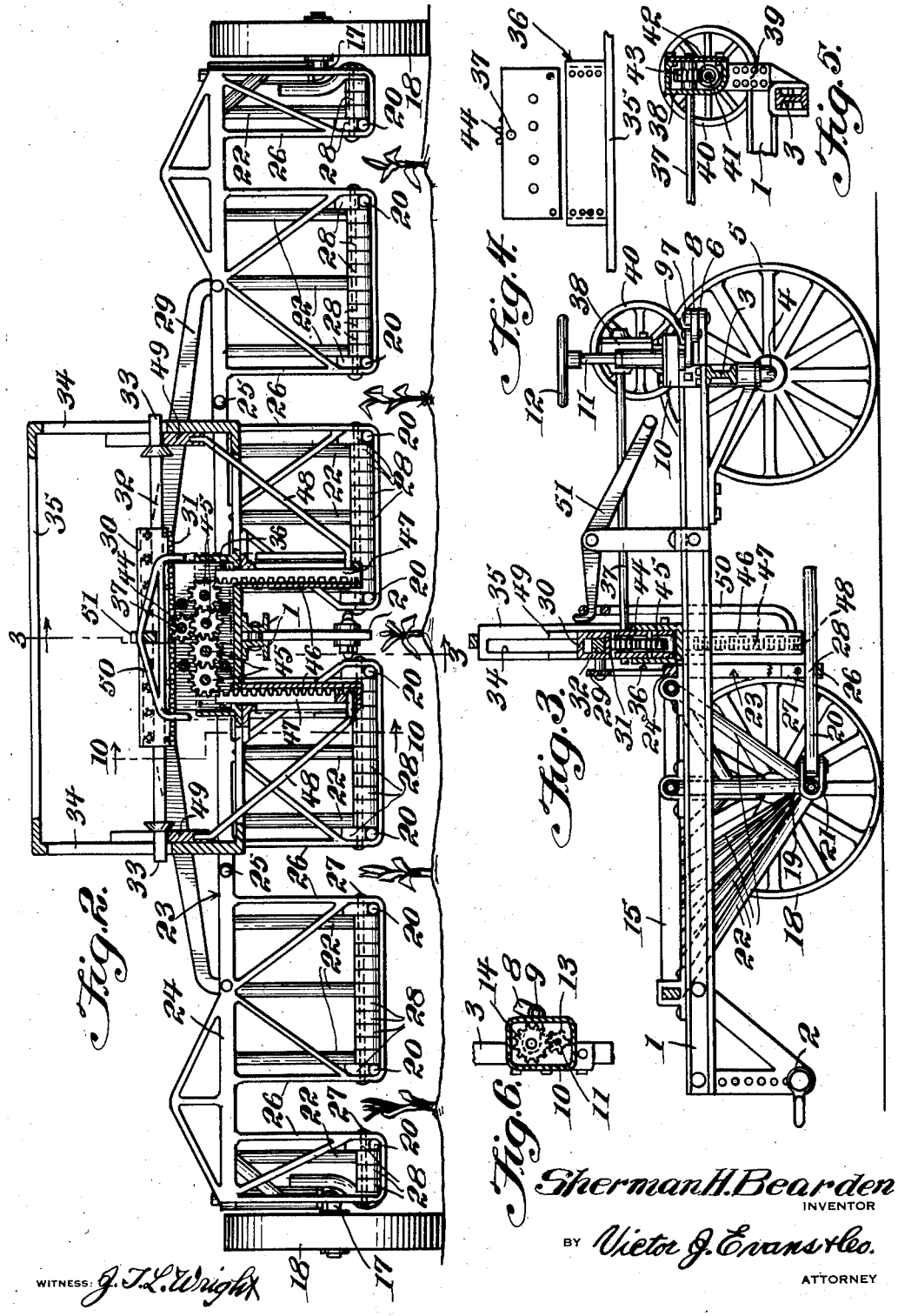

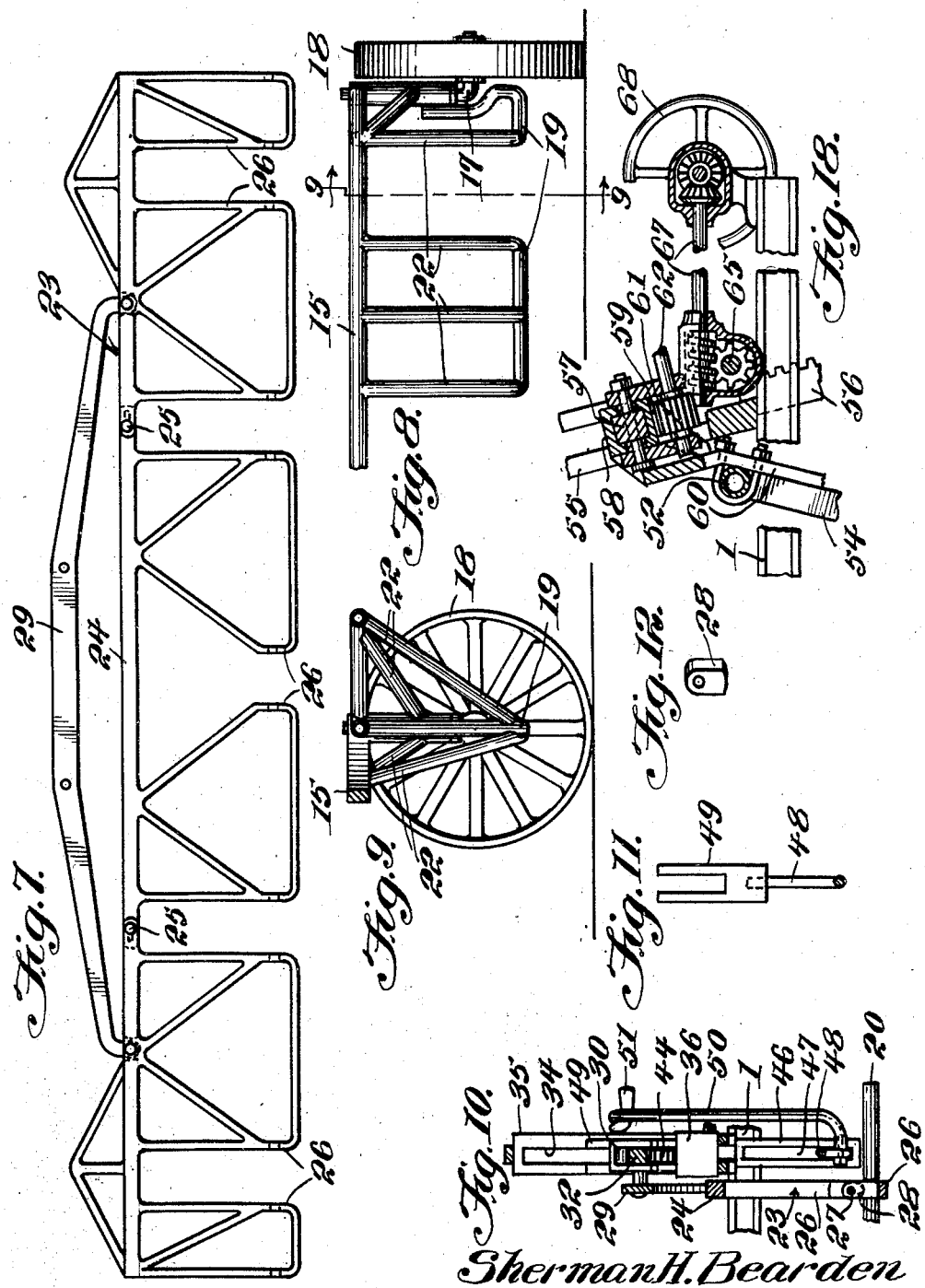

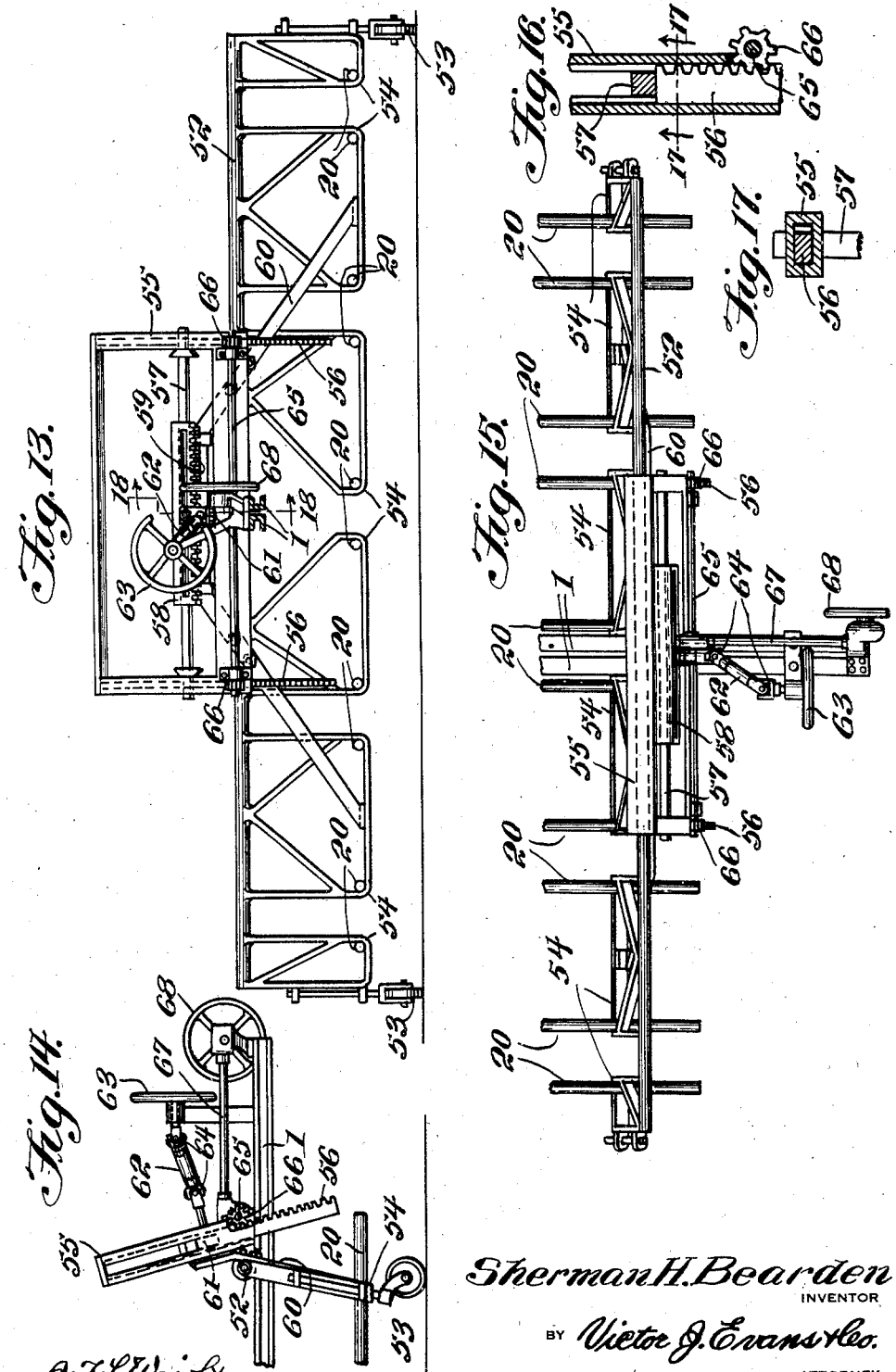

1,948,436

UNITED STATES PATENT OFFICE 1,948,436

CULTIVATOR

Sherman H. Bearden, Cass Station, Ga.

Application February 2, 1933. Serial No. 654,958

3 Claims. (Cl. 97—152)

This invention relates to cultivators of the straddle row type wherein a plurality of rows of vegetation may be simultaneously cultivated and has for the primary object, the provision of a device of the above stated character whereby cultivating mediums of the device may be adjusted independently of each other or adjusted simultaneously and laterally in either direction of the device to position said cultivating mediums at proper distances from the rows of vegetation to assure the working of the ground at a correct distance relative to the roots of the vegetation.

Another object of the invention is the provision of means for supporting the cultivating mediums whereby the latter may readily follow unevenness of the ground and also be adjusted vertically to regulate their depth of action in the ground.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a cultivator constructed in accordance with my invention.

Figure 2 is a transverse sectional view illustrating the means for adjusting the cultivating mediums vertically and horizontally relative to the device.

Figure 3 is a sectional view taken on the line 3—3 of Figure 1.

Figure 4 is a detail view illustrating an adjustable gear box.

Figure 5 is a fragmentary sectional view illustrating an adjustable support and gearing employed in the operating means employed to adjust the cultivating mediums.

Figure 6 is a detail view illustrating the gearing employed in the steering mechanism.

Figure 7 is a plan view illustrating adjusting frames for the cultivating mediums.

Figure 8 is a fragmentary elevational view illustrating a portion of the supporting frame for the cultivating mediums.

Figure 9 is a sectional view taken on the line 9—9 of Figure 8.

Figure 10 is a sectional view taken on the line 10—10 of Figure 2.

Figure 11 is a detail view illustrating a fragmentary portion of a forked member used in the adjusting means for the cultivating mediums.

Figure 12 is a perspective view illustrating one of the spacing elements employed for the cultivating mediums.

Figure 13 is a transverse sectional view illustrating a modified form of adjusting frame for the cultivating medium and also showing an operating means therefor.

Figure 14 is a fragmentary side elevation illustrating the same.

Figure 15 is a fragmentary top plan view illustrating a modified form of my invention.

Figure 16 is a fragmentary sectional view illustrating a portion of the operating means for the modified form of adjusting frame.

Figure 17 is a sectional view taken on the line 17—17 of Figure 16.

Figure 18 is a sectional view taken on the line 18—18 of Figure 13.

Referring in detail to the drawings, the numeral 1 indicates a main beam having connected to its forward end a draft hitch 2, while its rear end is attached to an axle 3 equipped with stub axles 4 on which are journaled ground steering wheels 5. The stub axles are provided with the usual arms 6 pivotally connected by a connecting bar 7. A link 8 is pivotally connected to one of the arms 6 and to an arm 9 of a steering mechanism which includes a mounting 10 carried by the main beam 1 and rotatably supporting a steering post 11 having a hand wheel 12. A gear 13 is secured to the steering post 11 and meshes with a gear 14 journaled in the mounting 10 and to which the arm 9 is secured. This construction permits the operator to readily steer the wheels 5 so as to cause the device to readily follow the draft medium to which it is connected.

A frame 15 is carried by the beam 1 rearwardly of the forward end of the latter and includes sections arranged at opposite sides of the beam 1 and hinged to the latter, as shown at 16. The frame 15, at its ends is provided with axles 17 on which are journaled ground wheels 18 cooperating with the wheels 5 in supporting the device for free movement over the ground. The sections of the frame 15 being hinged to the beam and supported by the wheels 18 will permit said sections to move upwardly and downwardly when passing over uneven ground. Depending from the frame 15 is a plurality of relatively spaced auxiliary frames 19 having the forward ends of cultivator beams 20 hinged thereto, as shown at 21. During the use of the device the depending auxiliary frames are adapted to travel between rows of vegetation. The cultivator beams extend rearwardly and downwardly and carry at their free ends any suitable type of cultivating shoes. Arranged between the auxiliary frames and the frame 15 are series of reinforcing braces 22 so spaced as to permit the passage of the vegetation without interfering with the latter.

An adjusting frame 23 is arranged transversely of the main beam 1 rearwardly of the frame 15 and consists of a sectional beam 24 wherein the sections are hinged together, as shown at 25. The beam 24 has depending therefrom spaced auxiliary frames 26 through which extend the cultivator beams, the latter resting upon the lower portions of said auxiliary frames 26. Each auxiliary frame carries a rod 27 removable therefrom and overlying the cultivator beams and has mounted thereon a plurality of spacing elements 28 engageable with the cultivator beams for preventing the latter from shifting within their respective auxiliary frame 26 and providing a construction whereby the cultivator beams may be adjusted towards and from each other by arranging the beams between different spacing elements, the latter being journaled on their respective rods 27 so that they may be swung upwardly to permit the adjustments of the beams to be made and then repositioned in engagement with the auxiliary frame for retaining the cultivator beams in their adjusted positions.

The adjusting frame 23 includes intermediate and end sections as shown in Figure 7. The end sections are pivotally connected to the ends of a rigid bar or yoke 29, the latter having secured thereto a housing 30 carrying a rack bar 31 and also having slidable therethrough a squared rod 32, the ends of which are formed to provide bearing portions 33 slidably mounted in slots 34 of a supporting bracket 35. The supporting bracket 35 is of rectangular shape and is suitably mounted on the beam 1 having the slots 34 located in the vertical side portions thereof. A gear casing 36 is carried by the beam 1 and receives the forward end of an operating shaft 37, the rear end of which is journaled in a mounting 38 carried by an adjustable bracket 39 mounting on the axle 3. A hand wheel 40 has the shaft 41 thereof journaled in the mounting 38 and a worm 42 is secured to the shaft 41 and meshes with a worm gear 43 secured to the rear end of the operating shaft 37, while the forward end of said operating shaft has secured thereto a gear 44. The gear 44 is located in the gear casing 36 and meshes with the rack bar 31. The housing 30 is provided between itself and the bar 32 with anti-friction mediums and the gear casing 36 is constructed of telescopic sections capable of being adjusted relative to each other and held in adjusted position by pins in one section fitting in openings of the other section, as shown in Figure 4, and the uppermost section has the operating shaft 37 journaled thereto and also has journaled therein a series of meshing gears 45, one of which meshes with the gear 44 of the operating shaft 37. Depending guides 46 are carried by the lower section of the gear casing 36 and slidably support rack bars 47 which may be moved into and out of mesh with the end gears of the series of gears 45 and which will be hereinafter more fully described. Rods 48 are connected to the lower ends of the rack bars and carry at their upper ends forked portions 49 having slidable contact with the vertical portions of the bracket 35 and receiving therein the rod 32. A yoke 50 is connected to the rods 48 and to one end of a pivotally mounted foot lever 51 whereby the operator may move the rack bars 47 into and out of mesh with the end gears of the series of gears 45.

To shift the cultivating mediums laterally, the operator rotates the hand wheel 40 in a proper direction and through the shaft 37 and the gear 44 meshing with the rack 31 of the housing 30 will cause the latter to slide on the bar 32, causing the adjusting frame 23 to shift laterally of the main beam 1 in the desired direction. When it is desired to elevate the cultivating mediums, the operator depresses the foot lever 51, raising the rack bars 47 into mesh with the end gears of the series of gears 45, then rotates the hand wheel 40 in the proper direction. The rotation of the hand wheel causes the rack bars to move vertically and the latter having the rods 48 secured thereto will impart an upward movement to the bar 32, raising the adjusting frame carrying therewith the cultivating mediums. Due to the worm 42 and the worm 43 of the operating shaft 37, the adjusting frame will maintain any of its adjusted positions either vertically or laterally of the main beam 1. It will also be noted due to the sections of the frame 15 and the sections of the adjusting frame that the cultivating mediums may readily raise and lower in accordance with the unevenness of the ground over which the device passes.

Referring to Figures 13 to 18, there is shown a modified form of adjusting frame and operating medium therefor which consists of a rigid bar 52 supported at its ends by ground wheels 53 and which extends transversely of the main beam 1 and has depending therefrom auxiliary frames 54 similar in construction to the auxiliary frames 26 and receiving the cultivator beams. A bracket 55 is mounted on the beam 1 and slidably supports vertically arranged rack bars 56, the upper ends of which engage a bar 57 similar to the bar 32. A housing 58 is slidable on the bar 57 and is constructed similar to the housing 30 having the rack teeth 59. A rigid yoke 60 is secured to the housing 58 and to pair of the depending auxiliary frames 54. A gear 61 meshes with the teeth 59 of the housing 58 and is secured to an operating shaft 62 connected to a hand wheel 63. The shaft 62 is suitably supported and includes sections connected by universal joints 64 so that the end section of the shaft 62 having the gear 61 secured thereto may follow the sliding movement of the housing 58. By rotating the hand wheel 63 the adjusting frame 52 may be slid laterally of the beam 1 in either direction.

A shaft 65 is rotatably supported and has secured thereto gears 66 meshing with the rack bars 56 and the shaft 65 is geared to an operating shaft 67 by worms and worm gears. A hand wheel 68 is geared to the operating shaft 67 so that the operator by rotating the hand wheel may raise and lower the adjusting frame.

While I have shown and described the preferred embodiment of my invention, it will be understood that minor changes in construction, combination and arrangement of parts may be made without departing from the spirit and scope of my invention, as claimed.

Having described the invention, I claim:

1. An agricultural implement comprising a main beam, a combined supporting and steering means for the beam, a sectional straddle row frame having each section hinged to the beam and arranged at opposite sides of the latter, ground wheels supporting the frame, an adjusting beam slidable relative to the main beam and including intermediate and end sections hingedly connected, auxiliary depending frames on said adjusting beam, ground engaging elements extending through and engaging the auxiliary frames and pivotally and slidably connected to the sectional frame, a yoke pivoted to the adjusting beam, means for adjusting the ground engaging elements relative to the auxiliary frame, and means connected to the yoke for sliding the adjusting beam endwise in either direction or vertically.

2. An agricultural implement comprising a main beam, a combined supporting and steering means for the beam, a sectional straddle row frame having each section hinged to the beam and arranged at opposite sides of the latter, ground wheels supporting the frame, an adjusting beam slidable relative to the main beam and including intermediate and end sections hingedly connected, auxiliary depending frames on said adjusting beam, ground engaging elements extending through and engaging the auxiliary frames and pivotally and slidably connected to the sectional frame, a yoke pivoted to the adjusting beam, means for adjusting the ground engaging elements relative to the auxiliary frame, a bracket mounted on the main beam, a rod slidably connected to the bracket, a housing slidable on the rod and secured to the yoke, and an operating means for sliding the housing to impart endwise movement to the adjusting beam.

3. An agricultural implement comprising a main beam, a combined supporting and steering means for the beam, a sectional straddle row frame having each section hinged to the beam and arranged at opposite sides of the latter, ground wheels supporting the frame, an adjusting beam slidable relative to the main beam and including intermediate and end sections hingedly connected, auxiliary depending frames on said adjusting beam, ground engaging elements extending through and engaging the auxiliary frames and pivotally and slidably connected to the sectional frame, a yoke pivoted to the adjusting beam, means for adjusting the ground engaging elements relative to the auxiliary frame, a bracket mounted on the main beam, a rod slidably connected to the bracket, a housing slidable on the rod and secured to the yoke, an operating means for sliding the housing to impart endwise movement to the adjusting beam, a gear casing mounted on the beam and supporting said operating means, a train of gears carried by said casing and connected to the operating means, guides carried by the casing, rack bars slidable in said guides, means for connecting the rack bars to said rod, and means connected to said last-named means for engaging and disengaging the rack bars with the train of gears.

SHERMAN H. BEARDEN.